United States Patent
Beim et al.

[11] Patent Number: 5,823,909
[45] Date of Patent: Oct. 20, 1998

[54] MULTIPLE SPEED AUTOMATIC TRANSAXLE FOR A MOTOR VEHICLE

[75] Inventors: Rudolf Beim, Bloomfield Hills; Daniel W. McCarrick, Canton, both of Mich.

[73] Assignee: Ford Global Technologies, Inc., Dearborn, Mich.

[21] Appl. No.: 807,971

[22] Filed: Mar. 3, 1997

[51] Int. Cl.$^6$ .................................. F16H 3/44; F16H 3/62
[52] U.S. Cl. ........................ 475/269; 475/275; 475/285; 475/290
[58] Field of Search ..................... 475/269, 271, 475/277, 278, 284, 287, 288, 289

[56] References Cited

U.S. PATENT DOCUMENTS

| | | | |
|---|---|---|---|
| 3,811,343 | 5/1974 | Mori et al. | 475/285 |
| 3,946,624 | 3/1976 | Murakami et al. | 475/290 |
| 4,070,927 | 1/1978 | Polak | 475/275 X |
| 4,172,393 | 10/1979 | Miller . | |
| 4,368,649 | 1/1983 | Vahratian et al. . | |
| 4,418,585 | 12/1983 | Pierce . | |
| 4,653,348 | 3/1987 | Hiraiwa . | |
| 4,660,439 | 4/1987 | Hiraiwa . | |
| 5,030,187 | 7/1991 | Asada . | |
| 5,049,116 | 9/1991 | Asada | 475/269 |
| 5,059,162 | 10/1991 | Otsuka . | |
| 5,071,398 | 12/1991 | Hotta et al. . | |
| 5,087,232 | 2/1992 | Asada . | |
| 5,129,871 | 7/1992 | Sandel et al. | 475/297 |
| 5,435,791 | 7/1995 | Zaiser et al. . | |
| 5,460,579 | 10/1995 | Kappel et al. . | |

*Primary Examiner*—Khoi Q. Ta
*Attorney, Agent, or Firm*—Frank G. McKenzie

[57] ABSTRACT

A kinematic arrangement of a multiple-speed automatic transmission for an automotive vehicle includes three simple planetary gear units, hydraulically actuated clutches and brakes applied and released selectively, and an overrunning clutch that produces a one-way drive connection between the sun gear of the first gear unit and a nonrotating member, such as the transmission casing. Each planetary gear unit includes a sun gear, a ring gear surrounding the sun gear, a carrier, and a set of planet pinions in continuous meshing engagement with the sun gear and ring gear and rotatably supported on the carrier.

14 Claims, 1 Drawing Sheet

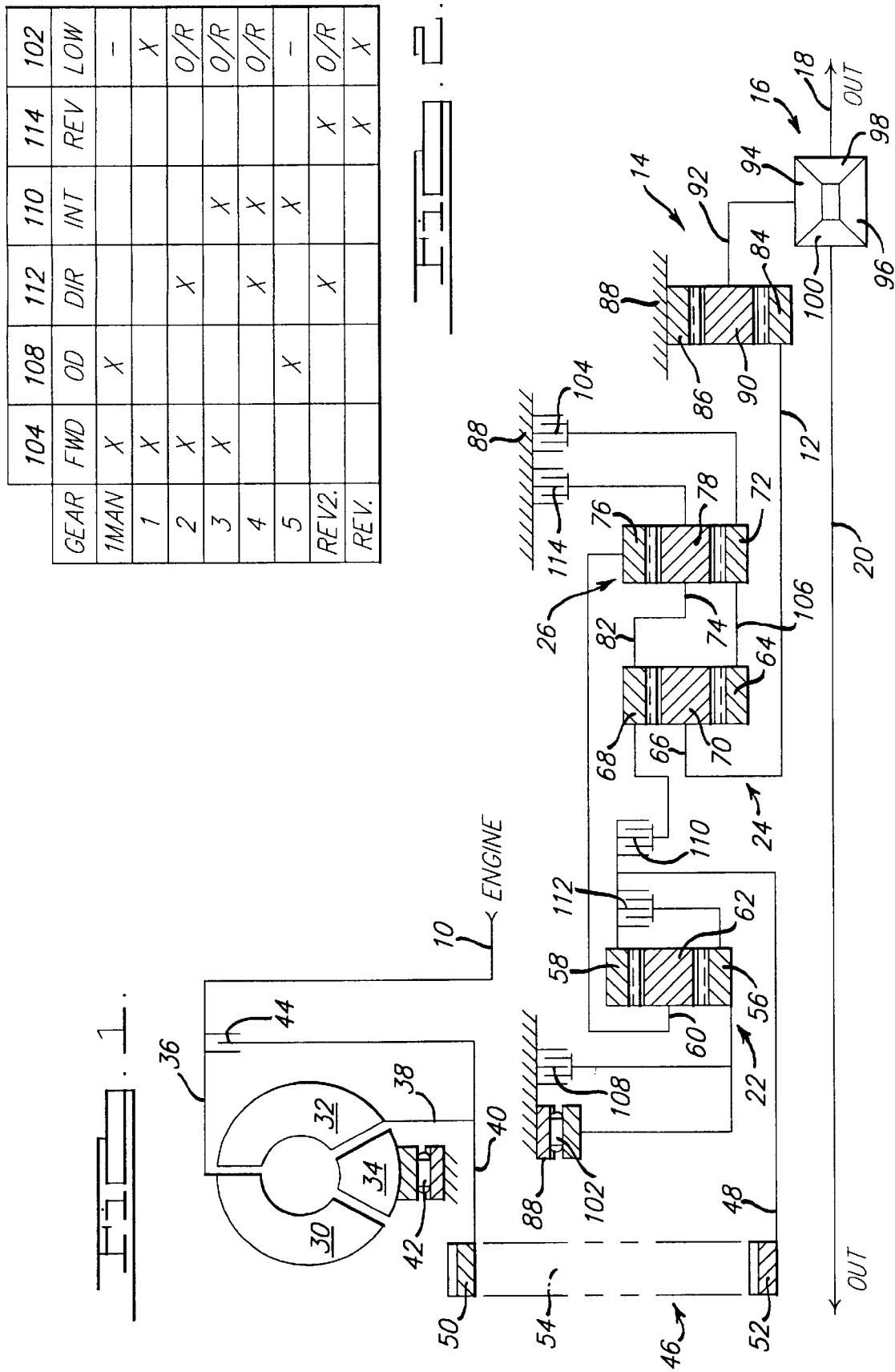

MULTIPLE SPEED AUTOMATIC TRANSAXLE FOR A MOTOR VEHICLE

BACKGROUND OF THE INVENTION

1. Field of the Invention

This invention pertains to the field of automatic transmissions kinematics.

2. Description of the Prior Art

Conventional transaxles include a hydrokinetic torque converter and a gear system arranged either coaxially with the torque converter axis or parallel to that axis. In transaxles of this type it is important that various torque transfer elements be arranged so that they occupy minimal space, particularly along the transverse axis of the motor vehicle. Gear box length along that axis is minimized to permit a transaxle to be located in the front-wheel drive vehicle, one in which the engine and transmission are located in a compartment restricted in a transverse or lateral direction, by chassis constraints, vehicle styling requirements, etc.

In addition, there is a growing need to develop more compact automatic gear arrangements with an increasing number of speed ratios in order to realize better fuel economy and to improve driveability. The transmission described in SAE Technical Paper 930676 describes a relative compact gear arrangement requiring three hydraulically actuated friction clutches and two hydraulically actuated friction brakes to produce five forward speed ratios and a reverse drive. Normally five forward speed ratios and a reverse drive would require three simple planetary gear units.

SUMMARY OF THE INVENTION

It is an object of the present invention to provide a compact five-speed transaxle having a U-drive torque delivery path wherein the crankshaft of an engine or other prime mover is located on a first axis disposed parallel to a second axis about which planetary gear sets friction clutches and brakes and other control elements are disposed. Preferably five forward speed ratios are provided, three underdriven ratios, a direct drive and one overdrive ratio. Two reverse ratios can be produced with the kinematic arrangement by suitable operation of the control elements.

It is another object of this invention to provide synchronous operation of the transmission employing two hydraulically-operated friction clutches and three friction brakes. In order to facilitate non-synchronous 1-2 and 2-1 gear ratio changes, a one-way clutch is included. The U-drive configuration employees a chain transfer drive mechanism between the turbine shaft and transmission input shaft.

In realizing these and other objects, a multiple-speed transmission according to this invention includes an input shaft; an output shaft; a first planetary gear unit supported on a first axis, having a sun gear, ring gear, carrier, and a first set of pinions supported rotatably on the carrier and driveably engaged with the sun gear and ring gear, the sun gear of the first gear unit continually driveably connected to the input shaft; a second planetary gear unit supported on a first axis, having a sun gear, ring gear, carrier, and a second set of pinions supported rotatably on the carrier and driveably engaged with the sun gear and ring gear of the second gear unit; a third planetary gear unit supported on a first axis, having a sun gear, ring gear, carrier, and a third set of pinions supported rotatably on the carrier and driveably engaged with the sun gear and ring gear, the carrier of the first gear unit and ring gear of the third gear unit continually driveably connected mutually, the carrier of the third gear unit and sun gear of the second gear unit continually driveably connected mutually, the sun gears of the second and third gear units continually driveably connected mutually, the carrier of the second gear unit continually driveably connected to the output shaft; a first brake for alternately holding against rotation and releasing the sun gears of the second and third gear units; a second brake for alternately holding against rotation and releasing the sun gear of the first gear unit; a third brake for alternately driveably holding against rotation and releasing the carrier of the third gear unit and ring gear of the second gear unit; a first clutch for alternatively driveably connecting and releasing the input shaft and ring gear of the first gear unit; and a second clutch for alternately driveably connecting and releasing the input shaft and ring gear of the second gear unit.

BRIEF DESCRIPTION OF THE DRAWINGS

FIG. 1 is a schematic diagram showing a kinematic arrangement of a five-speed automatic transmission according to this invention.

FIG. 2 is a chart showing the state of the friction elements and a one-way clutch corresponding to each of the speed ratios of the transmission of FIG. 1.

DESCRIPTION OF THE PREFERRED EMBODIMENT

Referring to FIG. 1, an engine crankshaft 10 is driveably connected through various shafts, hydraulically actuated friction clutches and brakes, and multiple planetary gear units to an output shaft 12, which is adapted for driveable connection to the traction wheels of the motor vehicle through a final drive gear set 14, differential mechanism 16, and axle shafts 18, 20. The main transmission housing encloses three planetary gear units 22, 24, 26.

A hydrokinetic torque converter 28 includes a bladed impeller 30, bladed turbine 32, and bladed stator 34. The impeller, turbine and stator are arranged in fluid flow relationship in a common toroidal circuit. Impeller includes a casing 36, connected driveably to crankshaft 10. Turbine 32 includes turbine hub 38 splined to a turbine shaft 40. The stator wheel is supported on the outer race of a one-way clutch 42, whose inner race is fixed to a nonrotating shaft or to the transmission housing. Clutch 42 produces a drive connection between the nonrotating member and the stator wheel with the first directional sense and overruns allowing free rotation of the stator wheel relative to the nonrotating member in the opposite directional sense.

Torque converter lock-up clutch 44 is splined to turbine shaft 40 and carries a friction surface, located at its radially outer end to engage driveably with the torque converter casing 36. Lock-up clutch 44 is engaged to complete a mechanical connection between the impeller and turbine when pressurized hydraulic fluid contained in torque converter casing forces the friction surfaces of clutch 44 against the casing 36. The torque converter clutch is disengaged so that the hydrodynamic driving connection exist between the impeller and turbine when pressurized hydraulic fluid is supplied through a passage located between the converter casing and friction surfaces of clutch 44 to disengage the clutch.

Power is transmitted by belt or chain drive mechanism 46 from the axis of the crankshaft 10 and turbine 40 to a parallel axis collinear with input shaft 48, about which planetary gear units 22, 24, 26, and the clutches, brakes, and shafts of the kinematic arrangements are located. The drive mechanism 46 includes a first sprocket wheel 50 rotatably mounted on turbine shaft 40, a second sprocket wheel 52 rotatably mounted on input shaft 48, and a drive belt or chain 54 driveable engaged with sprocket wheels 50, 52.

The first planetary gear unit 22 includes a sun gear 56, a ring gear 58 surrounding the sun gear, a pinion carrier 60, a first set of planet pinions 62 continually driveably engaged with ring gear 58 and sun gear 56.

The second planetary gear unit 24 includes sun gear 64, carrier 66, ring gear 68 surrounding the sun gear and carrier, and a set of planet pinions 70 continually driveably engaged with ring gear 64 and sun gear 68.

The third planetary gear unit 26 includes sun gear 72, carrier 74, ring gear 76 surrounding the sun gear and carrier, and a set of planet pinions 78 continually driveably engaged with ring gear 76 and sun gear 72.

Input shaft 48 is continually driveably connected to ring gears 58. Carrier 60 of the first gear unit 22 is continually driveably connected by a drum to the ring gear 76 of the third gear unit 26. Carrier 74 of third gear unit is continually driveably connected by element 82 to ring gear 68 of the second gear unit 24. Output shaft 12 continually driveably connects carrier 66 to the sun gear 84 of a final gear unit 14. Ring gear 86 of gear unit 14 is continually held against rotation on the transmission housing 88. Final drive pinions 90, which are rotatably supported on carrier 92, are in continuous meshing engagement with sun gear 84 and ring gear 86. Carrier 92 drives bevel pinions 94, 96 of the differential mechanism 16, and the output shafts 18, 20, which are fixed to the side bevel gears 98, 100, are driven through the differential mechanism 16.

In one-way clutch 102 has an inner race driveably connected continually to sun gear 56 and an outer race, held against rotation on transmission casing 88. A set of the drive elements are located between the inner and outer races and are adapted to engage clutch surfaces so that the inner race turns freely in one rotary direction and is held fixed against rotation through engagement of the drive elements on the clutch surfaces.

A forward brake 104 holds sun gears 64, 72, which are continually driveably connected by member 106, against rotation on the transmission casing 88 when brake 104 is engaged and permit sun gear 64 and 72 to rotate freely when brake 104 is disengaged.

Overdrive brake 108 holds sun gear 56 and the inner race of coupling 102 against rotation on the transmission housing when brake 108 is engaged, and allows sun gear 56 and the inner race to rotate freely when brake 108 is disengaged.

Intermediate clutch 110 driveably connects mutually carrier 74, input shaft 48 and ring gear 58 when the clutch is engaged. Disengagement of intermediate clutch 110 permits carrier 74, ring gear 68, input shaft 48 and ring gear 58 to rotate independently.

Direct clutch 112 driveably connects input shaft 48, ring gear 58 and intermediate clutch 110 mutually when clutch 112 is engaged. Disengagement of clutch 112 mutually disconnects input shaft 48, rear gear 58 and clutch 110. Reverse brake 114 holds carrier 74 ring gear 68 and an element of intermediate clutch 110 against rotation on the transmission casing 88 when brake 114 is applied. When brake 114 is released, carrier 74, ring gear 68 and the corresponding element of intermediate clutch 110 are free to rotate independently.

In operation, when the vehicle operator moves the range selector lever to the 1 position, thereby manually selecting first forward gear ratio operation, forward brake 108 and forward brake 104 are engaged, thereby holding sun gears 56, 64 and 72 against rotation. Input shaft 48 drives ring gear 58 directly, carrier 60 is driven at a reduced speed in comparison to that of input shaft 48, and the torque reaction is provided at sun gear 56. A second speed reduction occurs in the third gear unit 26, the output being taken at carrier 74 the torque reaction being provided at sun gear 72. A third speed reduction occurs in the second planetary gear unit 24. Ring gear 68 is driven directly from carrier 74, and the output is taken at carrier 66, which drives output shaft 12.

Thereafter, in the conventional way, the final drive unit 14 provides a fixed speed reduction by driving its sun gear 84 and taking the output at carrier 92 with sun gear 86 permanently fixed against rotation on the transmission housing 88. Operation of the final drive is the same for each of the gears ratios of the transmission.

When the vehicle operator moves the range selector lever to the drive range or overdrive range, the first automatically-engaged forward speed ratio results by engaging forward brake 104, which causes one-way coupling 102 to drive, thereby holding sun gear 56 against rotation on the transmission casing. Carrier 60 is underdriven by gear unit 22. A second speed reduction occurs in the third gear unit 26 with its output taken at carrier 74, which drives ring gear 68. A third speed reduction occurs in gear unit 24, the final output being taken at carrier 66 and output shaft 12. While the transmission operates in the first forward speed ratio in the automatic mode during cruise conditions, i.e., when the wheels drive the output shaft 12 and power is transmitted through the transmission to input shaft 48, coupling 102 overruns and there is no engine brake. However, during such cruise conditions when the operator selects first speed operation, a torque reaction is provided continually by OD break 108.

A non-synchronous upshift to the second forward speed ratio in the automatic range occurs by maintaining forward brake 104 engaged and engaging direct clutch 112. This action locks up the first planetary gear unit 22 and drives ring gear 76 at the speed of input shaft 48. Carrier 74 and ring gear 68 are underdriven in relation to speed of input shaft 48. Another speed reduction occurs in gear unit 24, the output being taken at carrier 66 and output shaft 12. During operation in the second, third and fourth forward speed ratios, coupling 108 overruns.

An upshift to the third forward speed ratio results by disengaging direct clutch 112, engaging intermediate clutch 110, and maintaining forward brake 104 engaged. With the transmission so disposed input shaft 48 drives ring gear 68 through intermediate clutch 110, sun gear 64 is held fixed against rotation, and carrier 66 is underdriven in relation to the speed of input shaft 48.

An upshift to the fourth speed ratio in the automatic mode results by disengaging forward brake 104 maintaining intermediate clutch 110 engaged, and engaging direct clutch 112. This action cause ring gear 58 and sun gear 56 to be driven at the speed of input shaft 48 so that carrier 60 and ring gear 76 are driven at that speed. Carrier 74 and ring gear 68 are driven from the input shaft through clutch 110, thereby locking up the third planetary gear unit and driving sun gear 64 and ring gear 68 at the speed of the input shaft 48. Carrier 66 and output shaft 12 are also driven at the speed of input shaft 48.

An upshift to the fifth forward speed ratio in the automatic mode results by maintaining intermediate clutch 110 engaged and engaging OD brake 108, thereby holding sun gear 56 fixed against rotation. The output of the first gear unit 22 is taken at carrier 60, which is underdriven in comparison to the speed of input shaft 48, and ring gear 76 is driven at the speed of carrier 60 a speed greater than that of input shaft 48. The speed of carrier 66 and output shaft 12 overdriven in relation to the speed of input shaft 48 since ring gear 68 is driven at the speed of shaft 48 and sun gear 64 is turning faster than shaft 48.

The transmission is capable of producing reverse drive in either of two different ways, each of which requires engagement of reverse brake 114, which holds carrier 74 and ring gear 68 fixed against rotation. The reverse low-speed ratio results by engaging direct clutch 112 in addition to reverse clutch 114, which action cause coupling 102 to overrun. The first gear unit is locked up and drives ring gear 76 at the speed of shaft 48. This causes sun gears 72, 64 to be underdriven in a reverse direction in relation to the speed of shaft 48. With ring gear 68 providing a torque reaction the output is taken from the second gear unit at carrier 66 and output shaft 12.

The second, higher reverse speed ratio is produced when reverse brake 114 is engaged, the other friction elements are disengaged and coupling 102 drives. With the transmission so disposed, coupling 102 holds ring gear 56 fixed against rotation on the transmission housing, shaft 48 drives ring gear 58, and the output of gear unit 22 is taken at carrier 60, which underdrives ring gear 76. The output of gear unit 26 is taken at sun gear 72, which is overdriven in the reverse direction in comparison to the speed of sun gear 76. A torque reaction is provided at ring gear 68, sun gear 64 is driven, and the output is taken at carrier 66 and output shaft 12.

The form of the invention shown and described herein constitutes the preferred embodiment of the invention; it is not intended to illustrate all possible forms thereof. The words used are words of description rather than of limitation, and various changes may be made from that which is described here without departing from the spirit and scope of the invention.

We claim:

1. A multiple-speed transmission comprising:
   an input shaft;
   an output shaft;
   a first planetary gear unit supported on a first axis, having a sun gear, ring gear, carrier, and a first set of pinions supported rotatably on the carrier and driveably engaged with the sun gear and ring gear, the ring gear of the first gear unit continually driveably connected to the input shaft;
   a second planetary gear unit supported on a first axis, having a sun gear, ring gear, carrier, and a second set of pinions supported rotatably on the carrier and driveably engaged with the sun gear and ring gear of the second gear unit;
   a third planetary gear unit supported on a first axis, having a sun gear, ring gear, carrier, and a third set of pinions supported rotatably on the carrier and driveably engaged with the sun gear and ring gear, the carrier of the first gear unit and ring gear of the third gear unit continually driveably connected mutually, the carrier of the third gear unit and ring gear of the second gear unit continually driveably connected mutually, the sun gears of the second and third gear units continually driveably connected mutually, the carrier of the second gear unit continually driveably connected to the output shaft;
   a first brake for alternately holding against rotation and releasing the sun gears of the second and third gear units; and
   a second brake for alternately holding against rotation and releasing the sun gear of the first gear unit.

2. The transmission of claim 1, wherein the second brake further comprises:
   an overrunning coupling for producing a one-way drive connection between the sun gear of the first gear unit and a nonrotating member; and
   a first friction brake arranged in parallel with the overrunning coupling between the sun gear of the first gear unit and the nonrotating member for alternatively driveably holding against rotation and releasing the sun gear of the first gear.

3. The transmission of claim 2, wherein the overrunning coupling further comprises:
   a first race continually driveably connected to the sun gear of the first gear unit;
   a second race fixed to the nonrotating member; and
   a drive member located between the first race and second race for producing a one-way drive connection therebetween.

4. The transmission of claim 1, further comprising a first clutch for alternatively driveably connecting and releasing the input shaft and sun gear of the first gear unit.

5. The transmission of claim 1, further comprising a second clutch for alternately driveably connecting and releasing the input shaft and ring gear of the second gear unit.

6. The transmission of claim 1, further comprising a third brake for alternately driveably holding against rotation and releasing the carrier of the third gear unit and ring gear of the second gear unit.

7. A multiple-speed transmission comprising:
   an input shaft;
   an output shaft;
   a first planetary gear unit supported on a first axis, having a sun gear, ring gear, carrier, and a first set of pinions supported rotatably on the carrier and driveably engaged with the sun gear and ring gear, the ring gear of the first gear unit continually driveably connected to the input shaft;
   a second planetary gear unit supported on a first axis, having a sun gear, ring gear, carrier, and a second set of pinions supported rotatably on the carrier and driveably engaged with the sun gear and ring gear of the second gear unit;
   a third planetary gear unit supported on a first axis, having a sun gear, ring gear, carrier, and a third set of pinions supported rotatably on the carrier and driveably engaged with the sun gear and ring gear, the carrier of the first gear unit and ring gear of the third gear unit continually driveably connected mutually, the carrier of the third gear unit and ring gear of the second gear unit continually driveably connected mutually, the sun gears of the second and third gear units continually driveably connected mutually, the carrier of the second gear unit continually driveably connected to the output shaft;
   a first brake for alternately holding against rotation and releasing the sun gears of the second and third gear units;
   a second brake for alternately holding against rotation and releasing the sun gear of the first gear unit;
   a third brake for alternately driveably holding against rotation and releasing the carrier of the third gear unit and ring gear of the second gear unit;
   a first clutch for alternatively driveably connecting and releasing the input shaft and sun gear of the first gear unit; and a second clutch for alternately driveably connecting and releasing the input shaft and ring gear of the second gear unit.

8. The transmission of claim 7, wherein the second brake further comprises:

an overrunning coupling for producing a one-way drive connection between the sun gear of the first gear unit and a nonrotating member; and a first friction brake arranged in parallel with the overrunning coupling between the sun gear of the first gear unit and the nonrotating member for alternatively driveably holding against rotation and releasing the sun gear of the first gear.

9. The transmission of claim 8, wherein the overrunning coupling further comprises:

a first race continually driveably connected to the sun gear of the first gear unit;

a second race fixed to the nonrotating member; and a drive member located between the first race and second race for producing a one-way drive connection therebetween.

10. A multiple-speed transmission comprising:

an input shaft;

an output shaft;

a first planetary gear unit supported on a first axis, having a sun gear, ring gear, carrier, and a first set of pinions supported rotatably on the carrier and driveably engaged with the sun gear and ring gear, the ring gear of the first gear unit continually driveably connected to the input shaft;

a second planetary gear unit supported on a first axis, having a sun gear, ring gear, carrier, and a second set of pinions supported rotatably on the carrier and driveably engaged with the sun gear and ring gear of the second gear unit;

a third planetary gear unit supported on a first axis, having a sun gear, ring gear, carrier, and a third set of pinions supported rotatably on the carrier and driveably engaged with the sun gear and ring gear, the carrier of the first gear unit and ring gear of the third gear unit continually driveably connected mutually, the carrier of the third gear unit and ring sun gear of the second gear unit continually driveably connected mutually, the sun gears of the second and third gear units continually driveably connected mutually, the carrier of the second gear unit continually driveably connected to the output shaft;

a first brake for alternately holding against rotation and releasing the sun gears of the second and third gear units;

a second brake for alternately holding against rotation and releasing the sun gear of the first gear unit;

a third brake for alternately driveably holding against rotation and releasing the carrier of the third gear unit and ring gear of the second gear unit.

11. The transmission of claim 10, further comprising a first clutch for alternatively driveably connecting and releasing the input shaft and sun gear of the first gear unit.

12. The transmission of claim 10, further comprising a second clutch for alternatively driveably connecting and releasing the input shaft and ring gear of the second gear unit.

13. The transmission of claim 10, wherein the second brake further comprises:

an overrunning coupling for producing a one-way drive connection between the sun gear of the first gear unit and a nonrotating member; and a first friction brake arranged in parallel with the overrunning coupling between the sun gear of the first gear unit and the nonrotating member for alternatively driveably holding against rotation and releasing the sun gear of the first gear.

14. The transmission of claim 13, wherein the overrunning coupling further comprises:

a first race continually driveably connected to the sun gear of the first gear unit;

a second race fixed to the nonrotating member; and a drive member located between the first race and second race for producing a one-way drive connection therebetween.

* * * * *